United States Patent
Hori et al.

(10) Patent No.: US 9,041,937 B2
(45) Date of Patent: May 26, 2015

(54) INTERFERENCE MEASUREMENT DEVICE AND MEASUREMENT METHOD

(75) Inventors: Masaru Hori, Nagoya (JP); Masafumi Ito, Nagoya (JP); Yasuhiro Higashijima, Nagoya (JP); Takayuki Ohta, Nagoya (JP)

(73) Assignees: NATIONAL UNIVERSITY CORPORATION NAGOYA UNIVERSITY, Nagoya-Shi, Aichi (JP); NU SYSTEM CORPORATION, Nagoya-Shi, Aichi (JP); MEIJO UNIVERSITY, Nagoya-Shi, Aichi (JP)

( * ) Notice: Subject to any disclaimer, the term of this patent is extended or adjusted under 35 U.S.C. 154(b) by 299 days.

(21) Appl. No.: 13/577,044

(22) PCT Filed: Feb. 2, 2011

(86) PCT No.: PCT/JP2011/000561
§ 371 (c)(1),
(2), (4) Date: Aug. 3, 2012

(87) PCT Pub. No.: WO2011/096200
PCT Pub. Date: Aug. 11, 2011

(65) Prior Publication Data
US 2012/0300218 A1 Nov. 29, 2012

(30) Foreign Application Priority Data
Feb. 5, 2010 (JP) .................................. 2010-024491

(51) Int. Cl.
G01B 11/02 (2006.01)
G01B 9/02 (2006.01)
G01K 11/00 (2006.01)

(52) U.S. Cl.
CPC ............ *G01B 9/02023* (2013.01); *G01K 11/00* (2013.01); *G01B 9/0209* (2013.01); *G01B 9/02058* (2013.01)

(58) Field of Classification Search
USPC ......................................................... 356/503
See application file for complete search history.

(56) References Cited

U.S. PATENT DOCUMENTS 5,943,134 A 8/1999 Yamaguchi et al.
6,922,250 B2 * 7/2005 Fercher ......................... 356/497

(Continued)

FOREIGN PATENT DOCUMENTS

| JP | 7-243818 A | 9/1995 |
| JP | 10-002855 A | 1/1998 |
| JP | 2001-091223 A | 4/2001 |
| JP | 2005-527280 | 9/2005 |
| JP | 2005-283155 A | 10/2005 |
| JP | 2006-194679 A | 7/2006 |
| JP | 2007-504475 A | 3/2007 |
| JP | 2007-531887 A | 11/2007 |
| WO | WO2006/100544 | 9/2006 |

OTHER PUBLICATIONS

International Search Report in PCT/JP2011/000561 dated Mar. 1, 2011 (English Translation Thereof).

*Primary Examiner* — Tarifur Chowdhury
*Assistant Examiner* — Jonathon Cook
(74) *Attorney, Agent, or Firm* — McGinn IP Law Group, PLLC

(57) ABSTRACT

[Problem to be Solved] To improve the measurement accuracy of an interference measurement device which utilizes interference of light.
[Means for Solution] An interference measurement device includes a light source 10 for emitting supercontinuum light (SC light), an optical fiber coupler 11 for splitting the SC light into measurement light and reference light, a dispersion compensation element 12, a drive unit 13 for moving the dispersion compensation element 12, and light-receiving means 14 for measuring an interference waveform produced as a result of interference between the measurement light and the reference light. A measurement object 15 to be measured is an Si substrate having a thickness of 800 μm. The dispersion compensation element 12 is an Si substrate having a thickness of 780 μm. Namely, the dispersion compensation element 12 is formed of the same material as that of the measurement object 15 and is 20 μm thinner than the measurement object 15. The interference caused by reflection on the back surface of the measurement object 15 and reflection on the back surface of the dispersion compensation element 12 has a narrow peak width because wavelength dispersion is cancelled almost completely. Thus, the accuracy in measuring the peak position improves. As a result, the accuracy in measuring temperature, etc., improves.

22 Claims, 5 Drawing Sheets

(56) References Cited

U.S. PATENT DOCUMENTS

| | | | |
|---|---|---|---|
| 6,989,905 B2* | 1/2006 | De Groot | 356/516 |
| 7,656,537 B2* | 2/2010 | Fercher | 356/496 |
| 8,610,900 B2* | 12/2013 | Wang et al. | 356/497 |
| 2005/0140981 A1 | 6/2005 | Waelti et al. | |
| 2005/0259716 A1* | 11/2005 | Ito et al. | 374/161 |
| 2006/0152734 A1 | 7/2006 | Suzuki et al. | |
| 2007/0064237 A1 | 3/2007 | Gelikonov et al. | |
| 2007/0279636 A1* | 12/2007 | Li et al. | 356/451 |
| 2008/0013078 A1* | 1/2008 | Podoleanu et al. | 356/73 |
| 2008/0304071 A1 | 12/2008 | Kallmann | |
| 2009/0015842 A1 | 1/2009 | Leitgeb et al. | |

* cited by examiner

INTERFERENCE MEASUREMENT DEVICE AND MEASUREMENT METHOD

TECHNICAL FIELD

The present invention relates to an interference measurement device and a measurement method for measuring the temperature of a measurement object from an interference waveform of light, and more particularly to an interference measurement device and a measurement method which are improved in accuracy in measuring temperature, etc. on the basis of interference.

BACKGROUND ART

In a process, such as a semiconductor process, in which thin-film growth or fine machining is performed, the temperature of a substrate greatly affects the quality of thin film and machining accuracy. Therefore, controlling the temperature of the substrate is very important, and accurate measurement of the temperature is required. Conventionally, a thermocouple, a fluorescent thermometer, or the like has been used for measurement of the temperature of a substrate. However, since the thermocouple and the fluorescent thermometer are brought into contact with the back surface of the substrate for measurement, a measurement error may arise if the state of contact is not good. Also, in the case of a plasma machining process in which thermal inflow occurs on the front surface side of a substrate, the temperature of the substrate itself cannot be measured.

In view of the above, a method for measuring the temperature of a measurement object in a non-contact condition has been demanded, and a method which utilizes interference of light has been proposed, such as that disclosed in Patent Document 1. In the disclosed method, the temperature of a measurement object is measured as follows. First, low-coherence light is split by a splitter into reference light and measurement light. The measurement light is caused to be incident on the measurement object and is reflected thereby, and the reference light is reflected by a mirror. The mirror is moved by a drive unit so as to change the optical path length of the reference light. The measurement light reflected by the measurement object and the reference light reflected by the mirror are caused to interfere, and the produced interference waveform is measured. Then, the temperature of the measurement object is measured from a change in the position of an interference peak caused by a change in refraction index with temperature or thermal expansion. Also, since an interference peak attributable to reflection on the front surface of the measurement object and an interference peak attributable to reflection on the back surface of the measurement object are obtained, the thickness of the measurement object can be measured. Examples of the light source include an SLD (super-luminescent diode), an LED, and a supercontinuum light source. Particularly, since supercontinuum light (SC light) has a flat spectrum of a wide band and has a short coherence length, conceivably, measurement accuracy can be improved by increasing resolution.

PRIOR ART DOCUMENT

Patent Document

Patent Document 1: Japanese Patent Application Laid-Open (kokai) No. 2006-194679

SUMMARY OF THE INVENTION

Problem to be Solved by the Invention

However, use of SC light brings about a problem. Specifically, since a produced interference waveform distorts due to wavelength dispersion caused by a measurement object, the accuracy of temperature measurement drops or temperature measurement itself becomes impossible.

An object of the present invention is to improve accuracy of measurement performed by an interference measurement device and an interference measurement method which measure interference of light through use of a supercontinuum light source.

Means for Solving the Problem

A first invention is an interference measurement device which measures interference between measurement light emitted onto a measurement object and reference light, characterized by comprising a light source for emitting supercontinuum light; splitting means for splitting the supercontinuum light into the measurement light to be emitted onto the measurement object and the reference light; a dispersion compensation element which is formed of a material having the same dispersion characteristic as that of the measurement object and which differs in thickness from the measurement object by an amount equal to or greater than the coherence length of the supercontinuum light; optical path length changing means for changing the optical path length of the measurement light or the reference light; and light-receiving means for measuring interference between the reference light reflected by the dispersion compensation element and the measurement light reflected by the measurement object.

The supercontinuum light (SC light) refers to light having a spectrum which has a large band width and is uniform in phase. Desirably, the band width is 100 nm to 2600 nm, and the coherence length is 10 μm or less. Within this range, the measurement accuracy can be improved further. More desirably, the coherence length is 0.5 μm to 10 μm, and most desirably, the coherence length is 0.5 μm to 2 μm.

The expression "material having the same dispersion characteristic as that of the measurement object" used in relation to the present invention encompasses a material having the same dispersion characteristic as that of the main constituent material of the measurement object and a material whose dispersion characteristic is sufficiently close to that of the main constituent material to achieve the action and effect of the present invention. Therefore, the dispersion compensation element is not required to be formed of a material whose dispersion characteristic is completely identical with that of the measurement object. The dispersion compensation element may be formed of a material different from that of the measurement object, so long as the dispersion characteristic of the material is close to that of the measurement object. For example, in the case where the measurement object is formed of Si, the dispersion compensation element may be formed of GaP or the like. The thickness of the dispersion compensation element is desired to be close to the thickness of the measurement object, because the effect of compensating dispersion is high. However, the dispersion compensation element and the measurement object must have a difference in thickness equal to or greater than the coherence length of the SC light from the light source, in order to prevent overlapping of interference peaks. The difference in thickness between the measurement object and the dispersion compensation element is desirably as small as possible, so long as the difference not less than the coherence length. The difference is desirably 1 to 100 times the coherence length, and more desirably, 2 to 50 times the coherence length.

A second invention is the interference measurement device according to the first invention, characterized in that the dispersion compensation element is formed of the same material as that of the measurement object.

The expression "the same material as that of the measurement object" used herein encompasses a material which is the same as the main constituent material of the measurement object or a material which is sufficiently similar to the main constituent material to achieve the action and effect of the present invention.

A third invention is the interference measurement device according to the first or second invention, characterized in that the difference in thickness between the dispersion compensation element and the measurement object is 1 to 100 times the coherence length of the supercontinuum light.

A fourth invention is the interference measurement device according to any of the first through third inventions, characterized in that the coherence length of the supercontinuum light is 0.5 μm to 10 μm.

A fifth invention is the interference measurement device according to any of the first through fourth inventions, characterized in that the measurement object is an Si substrate.

A sixth invention is the interference measurement device according to any of the first through fifth inventions, characterized in that the light-receiving means measures the temperature or thickness of the measurement object by measuring interference caused by reflection on a front surface of the measurement object and a front surface of the dispersion compensation element and interference caused by reflection on a back surface of the measurement object and a back surface of the dispersion compensation element.

A seventh invention is an interference measurement method for measuring interference between measurement light emitted onto a measurement object and reference light, characterized by comprising the steps of splitting supercontinuum light into measurement light and reference light; causing the measurement light to be incident onto the measurement object; causing the reference light to be incident onto a dispersion compensation element which is formed of a material having the same dispersion characteristic as that of the measurement object and which differs in thickness from the measurement object by an amount equal to or greater than the coherence length of the supercontinuum light; changing the optical path length of the measurement light or the reference light; and measuring interference between the reference light reflected by the dispersion compensation element and the measurement light reflected by the measurement object.

Effects of the Invention

If a light source which emits SC light is used in an interference measurement device or an interference measurement method for measuring interference of light, the interference peak broadens due to wavelength dispersion caused by a measurement object, which causes a drop in measurement accuracy. In order to overcome such a drawback, in the interference measurement device or the interference measurement method of the present invention, a dispersion compensation element is used as a mirror for reflecting the reference light. This dispersion compensation element is formed of a material having the same dispersion characteristic as that of the measurement object and which differs in thickness from the measurement object by an amount equal to or greater than the coherence length of the SC light. Thus, the peak of the interference caused by reflection on the back surface of the measurement object and reflection on the back surface of the dispersion compensation element has a narrow width because the influence on is removed through compensation. Thus, the accuracy measuring the position of the interference peak can be improved. As a result, the accuracy in measuring the temperature, thickness, temperature change of refraction index of the measurement object through measurement of interference can be improved.

MODE FOR CARRYING OUT THE INVENTION

A concrete example of the present invention will now be described with reference to the drawings; however, the present invention is not limited to the example.

EXAMPLE 1

Figure 1:
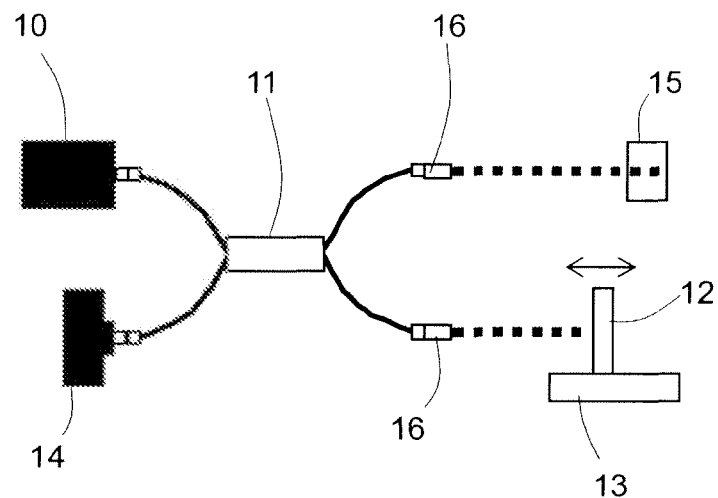
FIG. 1 is a view showing the configuration of an interference measurement device of Example 1.

FIG. 1 is a diagram showing the configuration of an interference measurement device of Example 1. The interference measurement device includes a light source 10, an optical fiber coupler 11 (corresponding to splitting means of the present invention), a dispersion compensation element 12, a drive unit 13, and a light-receiving means 14. A measurement object 15, which is an object to be measured, is an Si substrate having a thickness of 800 μm.

Figure 2:
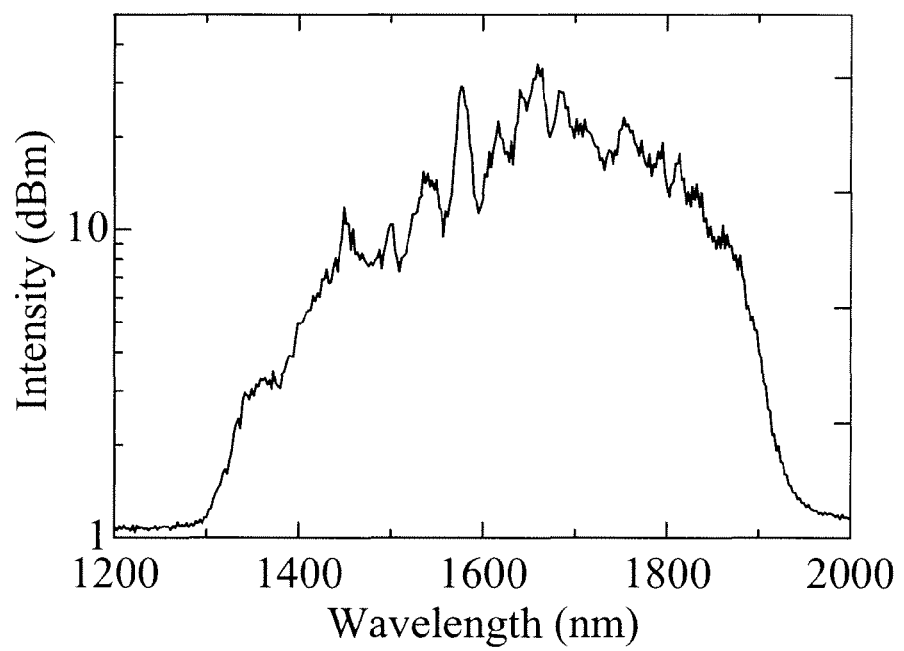
FIG. 2 is a graph showing the spectrum of SC light.

The light source 10 emits supercontinuum light (SC light), which is light having a continuous spectrum which has a large band width and is uniform in phase. This SC light is pulsed light (oscillation frequency: 50 MHz). FIG. 2 is a graph showing the spectrum of the SC light. FIG. 2 shows that the SC light has a flat spectrum whose center wavelength is about 1.6 µm and which has a wide wavelength range of 1.3 µm to 1.9 µm. Its coherence length is about 2 µm.

Desirably, the SC light has a coherence length of 0.5 µm to 10 µm. When the SC light has a coherence length within this range, there can be prevented occurrence of problems such as broadening of interference peaks and overlapping of interference peaks. Also, since interference peaks can be measured properly, measurement accuracy can be improved. More desirably, the SC light has a coherence length of 0.5 µm to 2 µm.

The optical fiber coupler 11 has a 2×2 port structure. The SC light from the light source 10 is input to one input port and is split into measurement light and reference light, which are emitted from the two output ports. Respective collimators 16 are connected to the two output ports. The light-receiving means 14 is connected to the other input port. The measurement light is caused to be incident perpendicularly on the front surface of the measurement object 15, and is reflected by the front and back surfaces of the measurement object 15. The reference light is reflected by the dispersion compensation element 12. The reflected measurement light and the reflected reference light enter the output portions from which the measurement light and the reference light are emitted, respectively. The reflected measurement light and the reflected reference light are mixed and the resultant light is introduced to the light-receiving means 14.

Instead of the optical fiber coupler 11, there may be used arbitrary means capable of splitting the light from the light source 10 into the measurement light and the reference light. For example, a cube-type beam splitter, a plate-type beam splitter, or a waveguide-type optical splitter may be used. However, use of an optical fiber coupler is desirable, because the optical fiber coupler can prevent measurement accuracy from decreasing due to, for example, disturbance by air.

The dispersion compensation element 12 is an Si substrate having a thickness of 780 µm. That is, the dispersion compensation element 12 is formed of the same material as that of the measurement object 15, and is 20 µm thinner than the measurement object 15. The dispersion compensation element 12 is attached to the drive unit 13 such that the surface which reflects the reference light becomes to be perpendicular to the optical axis of the reference light. The dispersion compensation element 12 can be moved over a predetermined range in the direction of the optical axis of the reference light. Thus, the optical path length of the reference light can be changed. The dispersion compensation element 12 is placed at room temperature. The drive unit 13 may be a voice-coil-motor-type delay line, a piezo-tube-type delay line, a direct-drive-stage-type delay line, a laminated-piezo-type delay line, or the like. The reference light is reflected by the front and back surfaces of the dispersion compensation element 12, is led to the optical fiber coupler 11, and is then received by the light-receiving means 14.

The dispersion compensation element 12 is not necessarily required to be formed of the same material as that of the measurement object 15, and may be formed of a material whose dispersion characteristic is close to that of Si. For example, the dispersion compensation element 12 may be formed of GaP. The difference in thickness between the dispersion compensation element 12 and the measurement object 15 is at least the coherence length of the SC light from the light source 10. If the difference in thickness is less than the coherence length, the interference peak produced as a result of reflection from the front surface of the measurement object 15 and reflection from the front surface of the dispersion compensation element 12 overlaps the interference peak produced as a result of reflection from the back surface of the measurement object 15 and reflection from the back surface of the dispersion compensation element 12. In order to clearly distinguish these two interference peaks and obtain the effect of dispersion compensation to a sufficient degree, the difference in thickness between the dispersion compensation element 12 and the measurement object 15 is desirably as small as possible, so long as the difference is not less than the coherence length of the SC light from the light source 10. The difference is preferably 1 to 100 times the coherence length of the SC light from the light source 10, more preferably 2 to 50 times the coherence length.

The light-receiving means 14 is a photo diode and measures an interference waveform produced as a result interference between the measurement light and the reference light. The interference waveform represents a change in light intensity (the sum of the light intensities of a large number of optical pulses) at the time when scanning is performed by moving the dispersion compensation element 12 by the drive unit 13 over a predetermined range in the direction of the optical axis. Instead of the photo diode, a photo transistor, a photomultiplier tube, or the like can be used.

Figure 3:
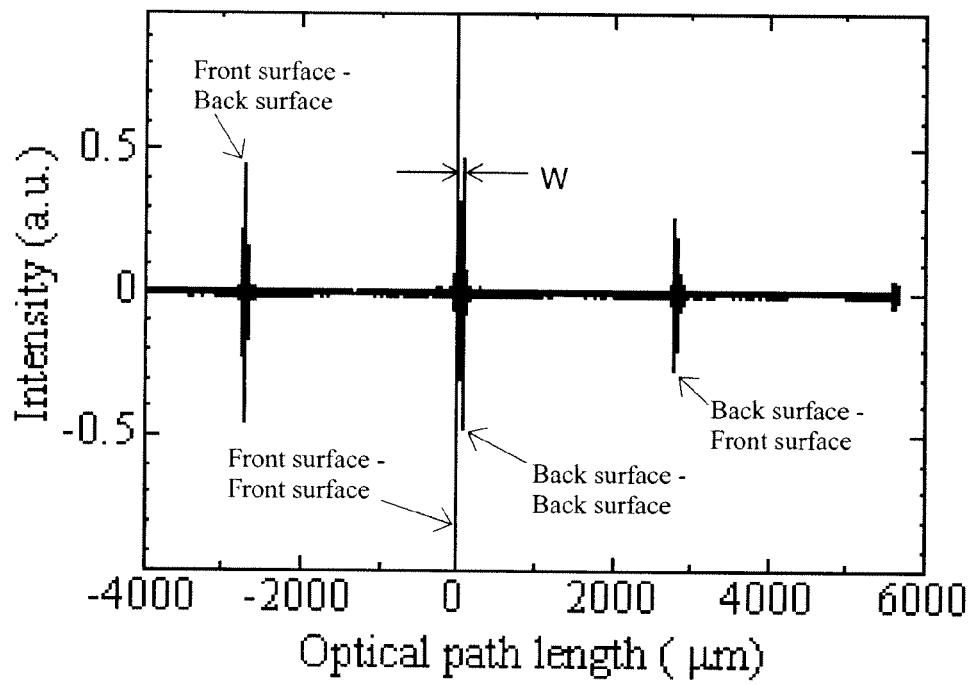
FIG. 3 is an illustration showing a measured interference waveform.
Figure 4:
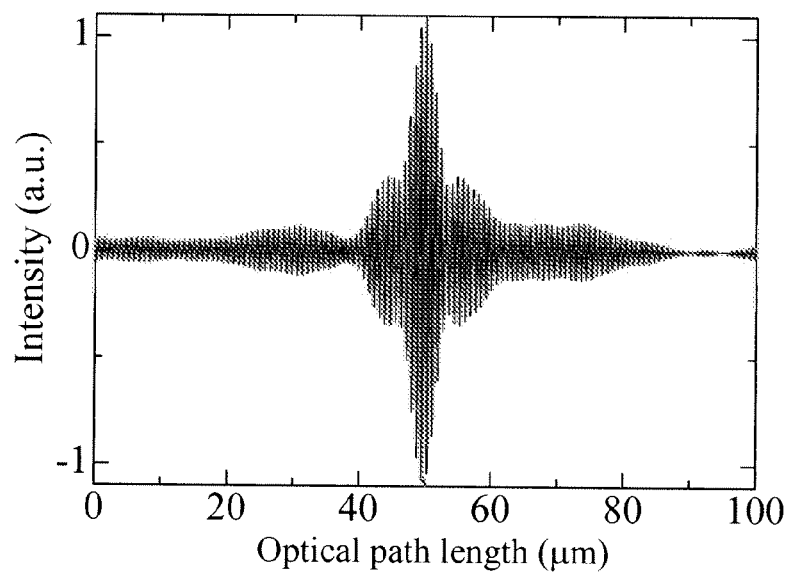
FIG. 4 is an illustration showing on an enlarged scale an interference waveform produced as a result of reflection from the front surface of a measurement object 15 and reflection from the front surface of a dispersion compensation element 12.
Figure 5:
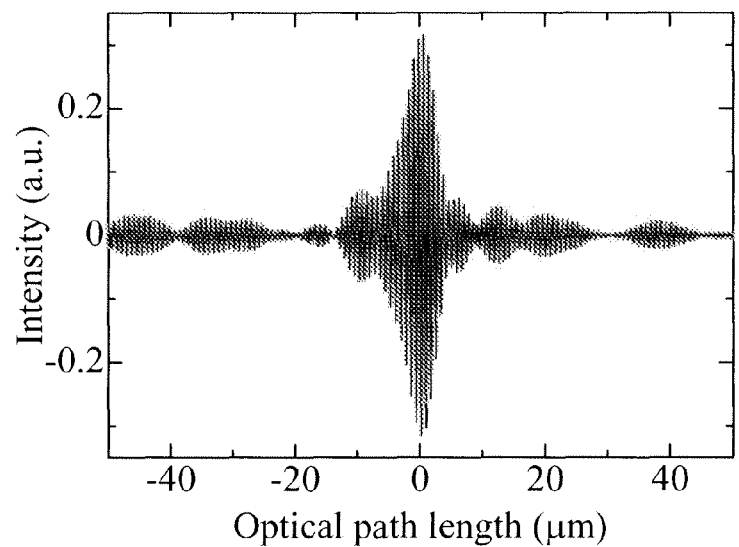
FIG. 5 is an illustration showing on an enlarged scale an interference waveform produced as a result of reflection from the back surface of the measurement object 15 and reflection from the back surface of a dispersion compensation element 12.

FIG. 3 is an illustration showing the result of an experiment in which the interference waveform produced as a result of reflection from the measurement object 15 was measured through use of the interference measurement device of Example 1, while the dispersion compensation element 12 was moved over a very small range by the drive unit 13. In FIG. 3, the horizontal axis represents the moving distance of the dispersion compensation element 12 converted to the optical path length, and the vertical axis represents light intensity. The measurement light is reflected by the front and back surfaces of the measurement object 15, and reaches the light-receiving means 14. The reference light is reflected by the front and back surfaces of the dispersion compensation element 12, and reaches the light-receiving means 14. Therefore, as shown in FIG. 3, four interference peaks are observed; i.e., the peak of interference caused by reflection from the front surface of the measurement object 15 and reflection from the back surface of the dispersion compensation element 12; the peak of interference caused by reflection from the front surface of the measurement object 15 and reflection from the front surface of the dispersion compensation element 12; the peak of interference caused by reflection from the back surface of the measurement object 15 and reflection from the back surface of the dispersion compensation element 12; and the peak of interference caused by reflection from the back surface of the measurement object 15 and reflection from the front surface of the dispersion compensation element 12, in this order from the left side of FIG. 3. FIG. 4 is an illustration showing on an enlarged scale an interference waveform produced as a result of interference between reflection from the front surface of the measurement object 15 and reflection from the front surface of a dispersion compensation element 12. FIG. 5 is an illustration showing on an enlarged scale an interference waveform produced as a result of interference between reflection from the back surface of the measurement object 15 and reflection from the back surface of a dispersion compensation element 12.

Of these four interferences, the interference caused by reflection from the front surface of the measurement object 15 and reflection from the front surface of the dispersion compensation element 12 does not receive the influence of wavelength dispersion caused by the measurement object 15 and the half-width of the interference peak is narrow (about 5.9

μm) as shown in FIG. 4, because the measurement light does not pass through the interior of the measurement object 15, and the reference light does not pass through the interior of the dispersion compensation element 12. Therefore, the position of the interference peak can be measured accurately.

Meanwhile, in the case of the interference caused by reflection from the front surface of the measurement object 15 and reflection from the back surface of the dispersion compensation element 12 and the interference caused by reflection from the back surface of the measurement object 15 and reflection from the front surface of the dispersion compensation element 12, since one of the measurement light and the reference light passes through the interior of the measurement object 15 or the dispersion compensation element 12 and is affected by the wavelength dispersion, the interference waveform is distorted, Therefore, accuracy in obtaining the position of the interference peak deteriorates.

In contrast, in the case of the interference caused by reflection from the back surface of the measurement object 15 and reflection from the back surface of the dispersion compensation element 12, both the measurement light and the reference light receive the same degree of influence of wavelength dispersion from the measurement object 15 and the dispersion compensation element 12, respectively. Therefore, the wavelength dispersion is cancelled out almost completely in the interference between the measurement light and the reference light, and, as shown in FIG. 5, the distortion of the interference waveform is removed through compensation. As a result, the half-width of the interference peak was very narrow (about 4.1 μm). Therefore, the position of the interference peak can be measured accurately.

Accordingly, the temperature, etc. of the measurement object 15 can be measured accurately by use of the position of the interference peak produced as a result of interference between reflection from the front surface of the measurement object 15 and reflection from the front surface of the dispersion compensation element 12 and the position of the interference peak produced as a result of interference between reflection from the back surface of the measurement object 15 and reflection from the back surface of the dispersion compensation element 12.

Figure 6:
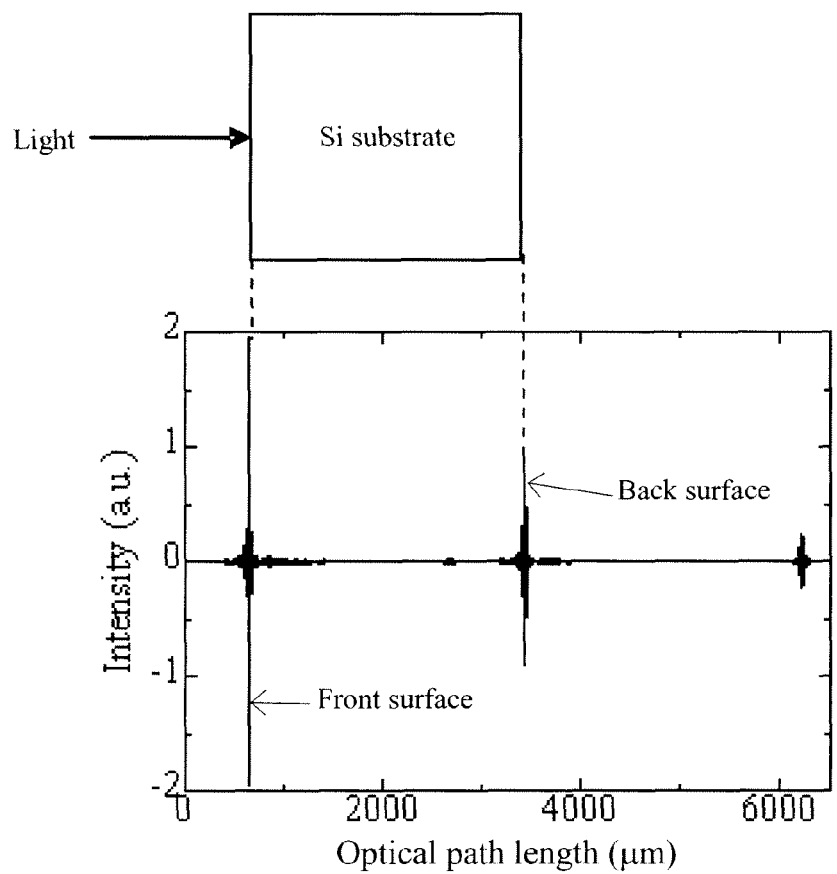
FIG. 6 is an illustration showing an interference waveform produced when an interference measurement device of a comparative example is used.
Figure 7:
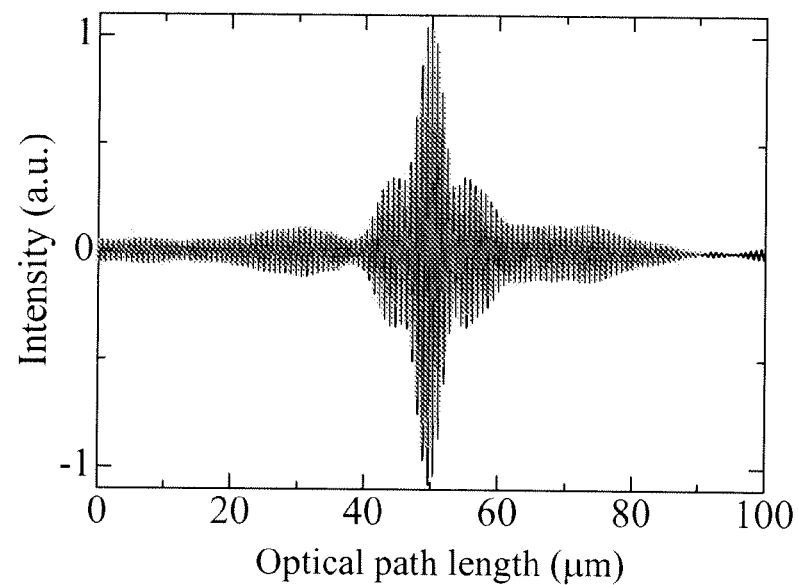
FIG. 7 is an illustration showing on an enlarged scale an interference waveform produced as a result of reflection from the front surface of the measurement object 15 and reflection from an aluminum mirror.
Figure 8:
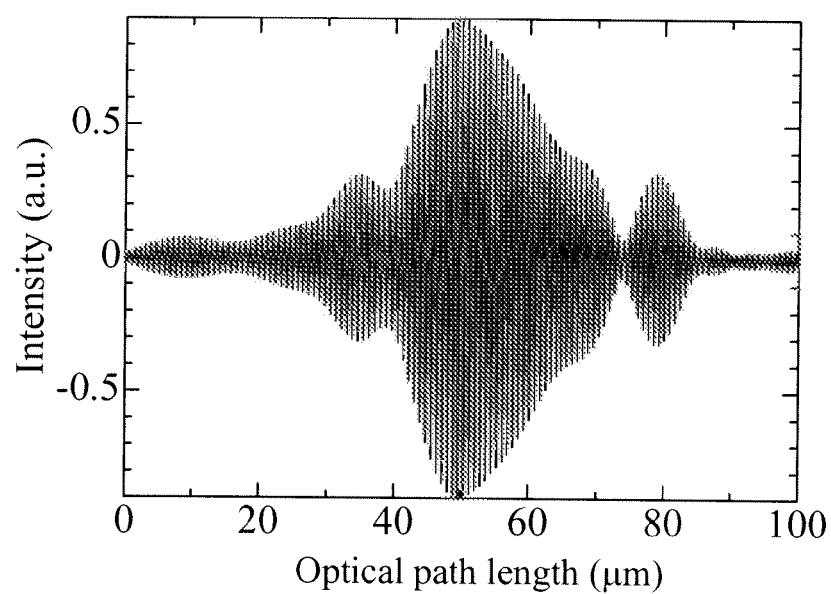
FIG. 8 is an illustration showing on an enlarged scale an interference waveform produced as a result of reflection from the back surface of the measurement object 15 and reflection from the aluminum mirror.

For comparison, the interference waveform produced as a result of reflection from the measurement object 15 was measured by use of an interference measurement device (hereinafter referred to as the "interference measurement device of Comparative Example 1) which is identical with the interference measurement device of Example 1 except that an aluminum mirror is used in place of the dispersion compensation element 12. FIG. 6 shows the measured interference waveform. The horizontal axis represents the moving distance of the aluminum mirror converted to the optical path length, and the vertical axis represents light intensity. FIG. 7 is an illustration showing on an enlarged scale an interference waveform produced as a result of reflection from the front surface of the measurement object 15 and reflection from the aluminum mirror. FIG. 8 is an illustration showing on an enlarged scale an interference waveform produced as a result of reflection from the back surface of the measurement object 15 and reflection from the aluminum mirror.

The interference caused by reflection from the front surface of the measurement object 15 and reflection from the aluminum mirror is not influenced by the wavelength dispersion caused by the measurement object 15. Therefore, as can be understood from comparison between FIGS. 4 and 7, the measured interference waveform is approximately the same as that shown in FIG. 4, and the half-width of the interference peak was about 7 μm.

Meanwhile, in the case of the interference caused by reflection from the back surface of the measurement object 15 and reflection from the aluminum mirror, only the measurement light receives the influence of the wavelength dispersion caused by the measurement object 15. Therefore, as can be understood from comparison between FIGS. 5 and 8, the measured interference waveform has a distortion, and the half-width of the interference peak is wide (about 20 μm). Therefore, the position of the interference peak cannot be measured accurately.

As described above, the interference measurement device of Example 1, which uses the dispersion compensation element 12 as a mirror for reflecting the reference light, can measure the position of the interference peak more accurately, as compared with the interference measurement device of Comparative Example 1, which uses an aluminum mirror.

Next, the measurement object 15 (Si substrate) having a thickness of 800 μm was heated and its temperature was measured by the interference measurement device of Example 1. Notably, the dispersion compensation element 12 was not heated and maintained at room temperature. The measurement object 15 and the dispersion compensation element 12 have known thicknesses, known coefficients of linear expansion, and known temperature changes of refraction index. Therefore, the temperature of the measurement object 15 was obtained from a temperature change of the difference (W in FIG. 3) between the peak position of the interference caused by reflection from the front surface of the measurement object 15 and reflection from the front surface of the dispersion compensation element 12 and the peak position of the interference caused by reflection from the back surface of the measurement object 15 and reflection from the back surface of the dispersion compensation element 12.

Specifically, the temperature of the measurement object 15 was obtained as follows. A temperature change $\Delta L$ of the optical path length of the measurement light at the time when the temperature changes from T1 by $\Delta L$ is represented by $\Delta L = n \cdot d \cdot (\alpha + \beta) \cdot \Delta T$, where n represents the refraction index of the measurement object 15 at the temperature T1, d represents the thickness, $\alpha$ represents the coefficient of linear expansion, and $\beta$ represents a coefficient of the temperature change of the refraction index. Since the dispersion compensation element 12 is formed of Si like the measurement object 15, the temperature change of the optical path length of the reference light is also represented by the above-described expression, although the thickness d differs from that in the above-described expression. Meanwhile, the difference W between the peak positions in the interference waveform corresponds to the difference in optical path length caused by the difference in thickness between the measurement object 15 and the dispersion compensation element 12. Accordingly, through measurement of the temperature change of the peak position difference W, the temperature change of the optical path length difference can be determined, and the temperature can be obtained from the above-described expression.

Figure 9:
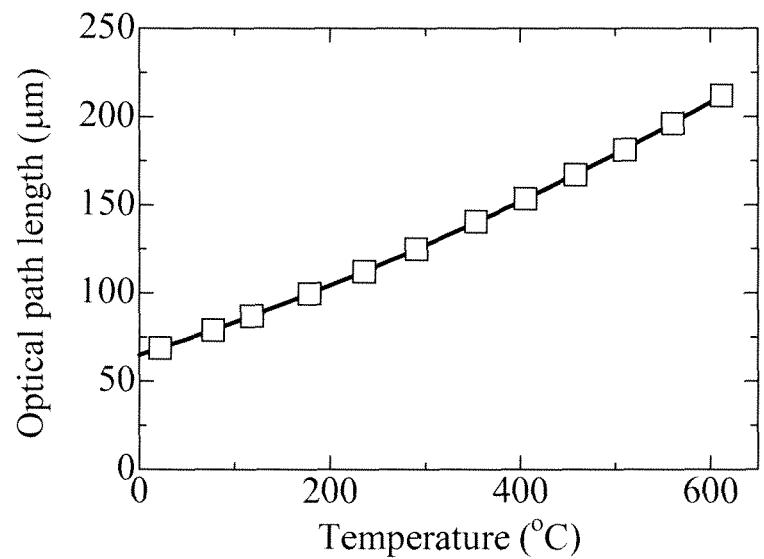
FIG. 9 is a graph showing the relation between temperature and optical path length.

FIG. 9 is a graph showing the relation between the temperature and the peak position difference W. In the graph of FIG. 9, a continuous curve represents theoretical values, and square marks represent the temperatures measured by the above-described method. As shown in FIG. 4, the measured temperatures approximately coincide with the theoretical values within a range of 0 to 600° C. This shows that the temperature of the measurement object 15 can be measured accurately through use of the interference measurement device of Example 1.

In the above-described temperature measurement, the measurement error measurement values in relation to the theoretical values was ±0.4° C. Meanwhile, when the temperature of the measurement object 15 was measured by the interference measurement device of Comparative Example 1 which uses an aluminum mirror instead of the dispersion compensation element 12, the temperature measurement error was ±1.7° C. In the case where the same measurement was carried out through use of the interference measurement device of Example 1, with the dispersion compensation element 12 replaced with an aluminum mirror, and the light source replaced with an SLD (super-luminescent diode) having a center wavelength of about 1580 nm and a half-width of about 40 nm, the measurement error was ±1.0° C. As described above, it was found that the interference measurement device of Example 1, which uses the dispersion compensation element 12 as a mirror for reflecting the reference light, has an improved temperature measurement accuracy, as compared with the conventional interference measurement devices in which an SLD is used as a light source or an aluminum mirror is used as a mirror for reflecting the reference light.

In Example 1, an Si substrate is used as the measurement object 15, the interference measurement device of the present invention can be utilized for measurement of interference caused by reflection from a measurement object which is formed of an arbitrary material which can reflect SC light.

Example 1 shows an example case in which the temperature of the measurement object 15 is measured through utilization of interference; however, the thickness of the measurement object can be measured. In the case where the thickness of the dispersion compensation element 12 is known, the thickness of the measurement object 15 can be measured by obtaining the difference W in peak position between the interference caused by reflection from the front surface of the measurement object 15 and reflection from the front surface of the dispersion compensation element 12 and the interference caused by reflection from the back surface of the measurement object 15 and reflection from the back surface of the dispersion compensation element 12. In the interference measurement device of Example 1, the peak of the interference caused by reflection from the back surface of the measurement object 15 and reflection from the back surface of the dispersion compensation element 12 is narrow, and the peak position can be measured accurately. Therefore, the peak position difference W can also be measured accurately. Accordingly, the thickness of the measurement object 15 can also be measured accurately. Also, the temperature and thickness of the measurement object 15 may be measured simultaneously. Also, in the case where the temperature and thickness of the measurement object 15 are known, the temperature change of the refraction index of the measurement object can be measured, and measurement can be performed accurately for the same reason as described above. Also, through Fourier transformation of the interference waveform, the state of the front and back surfaces of the measurement object 15 can be analysed accurately. For example, an impurity adhering to the front surface can be identified accurately.

In Example 1, the optical path length of the reference light is changed by moving the dispersion compensation element 12 by the drive unit 13. However, this configuration may be modified such that the dispersion compensation element 12 is fixed, and the measurement object 15 is moved so as to change the optical path length of the measurement light to thereby cause interference. Also, the optical path length may be changed by a method other than moving the dispersion compensation element 12 or the measurement object 15. For example, the reference light or the measurement light is caused to pass through a ferroelectric crystal, and a voltage applied to the ferroelectric crystal is changed so as to change the permittivity, to thereby change the optical path length of the reference light or the measurement light passing through the ferroelectric crystal.

Also, the above-described configuration may be modified such that the measurement light or the reference light is split into a plurality of light beams, and differences in optical path length are provided among the plurality of measurement light beams or the plurality of reference light beams. This modified configuration can shorten the distance by which the dispersion compensation element 12 or the measurement object 15 is moved until the interference between one of the plurality of measurement light beams and the reference light or the interference between the measurement light and one of the plurality of reference light beams is measured. Thus, the time required for measurement can be shortened. Also, the above-described configuration may be modified such that the measurement light is split into a plurality of measurement light beams, and the plurality of measurement light beams are caused to be incident on a measurement object at different position so as to measure the temperature distribution or thickness distribution within the surfaced of the measurement object.

INDUSTRIAL APPLICABILITY

The interference measurement device of the present invention can be used for controlling the temperature of a substrate in a semiconductor process.

DESCRIPTION OF REFERENCE NUMERALS

10: light source
11: optical fiber coupler
12: dispersion compensation element
13: drive unit
14: light-receiving means
15: measurement object

The invention claimed is:

1. An interference measurement device which measures an interference between measurement light emitted onto a measurement object, which comprises a front surface and a back surface, and reference light, the interference measurement device comprising:
    a light source for emitting supercontinuum light, the supercontinuum light comprising the measurement light to be emitted onto the measurement object and the reference light;
    a dispersion compensation element which comprises a material having substantially a same dispersion characteristic as that of the measurement object and which differs in thickness from the measurement object by an amount equal to or greater than a coherence length of the supercontinuum light, the dispersion compensation element comprising a front surface and a back surface; and
    a light detector for measuring an interference between the reference light reflected by the dispersion compensation element and the measurement light reflected by the measurement object; and
    a processor for measuring a first position of an interference peak caused by reflection on the front surface of the measurement object and the front surface of the dispersion compensation element, and a second position of an interference peak caused by reflection on the back surface of the measurement object and the back surface of the dispersion compensation element and for measuring a length difference between the first position and the second position, and for deciding a temperature or a thickness of the measurement object;

wherein the supercontinuum light has a wavelength which is able to pass through the measurement object and the dispersion compensation element.

2. The interference measurement device according to claim 1, further comprising:

a light splitter for splitting the supercontinuum light emitted from the light source into the measurement light and the reference light.

3. The interference measurement device according to claim 1, further comprising:

an optical path length changing device for changing an optical path length of the measurement light or the reference light.

4. The interference measurement device according to claim 2, further comprising:

an optical path length changing device for changing an optical path length of the measurement light or the reference light.

5. The interference measurement device according to claim 1, wherein the dispersion compensation element comprises a same material as that of the measurement object.

6. The interference measurement device according to claim 4, wherein the dispersion compensation element comprises a same material as that of the measurement object.

7. The interference measurement device according to claim 1, wherein a difference in thickness between the dispersion compensation element and the measurement object is 1 to 100 times the coherence length of the supercontinuum light.

8. The interference measurement device according to claim 4, wherein a difference in thickness between the dispersion compensation element and the measurement object is 1 to 100 times the coherence length of the supercontinuum light.

9. The interference measurement device according to claim 1, wherein the coherence length of the supercontinuum light is 0.5 µm to 10 µm.

10. The interference measurement device according to claim 4, wherein the coherence length of the supercontinuum light is 0.5 µm to 10 µm.

11. The interference measurement device according to claim 7, wherein the coherence length of the supercontinuum light is 0.5 µm to 10 µm.

12. The interference measurement device according to claim 1, wherein the measurement object comprises an Si substrate.

13. The interference measurement device according to claim 1, wherein the supercontinuum light has the wavelength such that a part is reflected by the front surface of the measurement object, and a remaining part passes through the measurement object, is reflected by the back surface of the measurement object, and emitted from the front surface of the measurement object in a direction opposite to an incident direction of the supercontinuum light.

14. The interference measurement device according to claim 1, wherein the supercontinuum light has the wavelength that is partially reflected by the front surface of the diffusion compensation element, and a remaining part passes through the dispersion compensation element, is reflected by the back surface of the dispersion compensation element, and emitted from the front surface of the dispersion compensation element in a direction opposite to a incident direction of the supercontinuum light.

15. The interference measurement device according to claim 1, wherein the light detector obtains the first position of the interference peak between the measurement light reflected by the front surface of the measurement object and the reference light reflected by the front surface of the diffusion compensation element, and the second position of the interference peak between the measurement light reflected by the back surface of the measurement object and the reference light reflected by the back surface of the dispersion compensation element.

16. The interference measurement device according to claim 1, wherein the thickness or the temperature of the measurement object is measured based on the length difference between the first position and the second position.

17. The interference measurement method for measuring an interference between measurement light emitted onto a measurement object, which comprises a front surface and a back surface, and reference light, the method comprising:

causing the measurement light to be incident on the measurement object;

causing the reference light to be incident on a dispersion compensation element which comprises a material having substantially a same dispersion characteristic as that of the measurement object and which differs in thickness from the measurement object by an amount equal to or greater than a coherence length of the supercontinuum light, the dispersion compensation element comprising a front surface and a back surface; and measuring an interference between the reference light reflected by the dispersion compensation element and the measurement light reflected by the measurement object, measuring a first position of an interference peak caused by reflection on the front surface of the measurement object and the front surface of the dispersion compensation element and a second position of an interference peak caused by reflection on the back surface of the measurement object and the back surface of the dispersion compensation element, and measuring a length difference between the first position and the second position and for deciding a temperature or a thickness of the measurement object, wherein the supercontinuum light has a wavelength which is able to pass through the measurement object and the dispersion compensation element.

18. The interference measurement method according to claim 17, further comprising:

splitting supercontinuum light into the measurement light and the reference light; and changing an optical path length of the measurement light or the reference light for obtaining the interference.

19. The interference measurement method according to claim 17, wherein the supercontinuum light has the wavelength such that a part is reflected by the front surface of the measurement object, and a remaining part passes through the measurement object, is reflected by the back surface of the measurement object, and emitted from the front surface of the measurement object in a direction opposite to an incident direction of the supercontinuum light.

20. The interference measurement method according to claim 17, wherein the supercontinuum light has the wavelength that is partially reflected by the front surface of the diffusion compensation element, and a remaining part passes through the dispersion compensation element, is reflected by the back surface of the dispersion compensation element, and emitted from the front surface of the dispersion compensation element in a direction opposite to a incident direction of the supercontinuum light.

21. The interference measurement method according to claim 17, wherein the first position of the interference peak between the measurement light reflected by the front surface of the measurement object and the reference light reflected by the front surface of the diffusion compensation element, and the second position of the interference peak between the measurement light reflected by the back surface of the measurement object and the reference light reflected by the back surface of the dispersion compensation element are obtained.

22. The interference measurement method according to claim 17, wherein the thickness or the temperature of the measurement object is measured based on the length difference between the first position and the second position.

* * * * *